Aug. 8, 1950      A. R. CLARK      2,518,284
MULTIPLE COMPRESSOR TRUCK REFRIGERATION UNIT
Filed Dec. 4, 1948
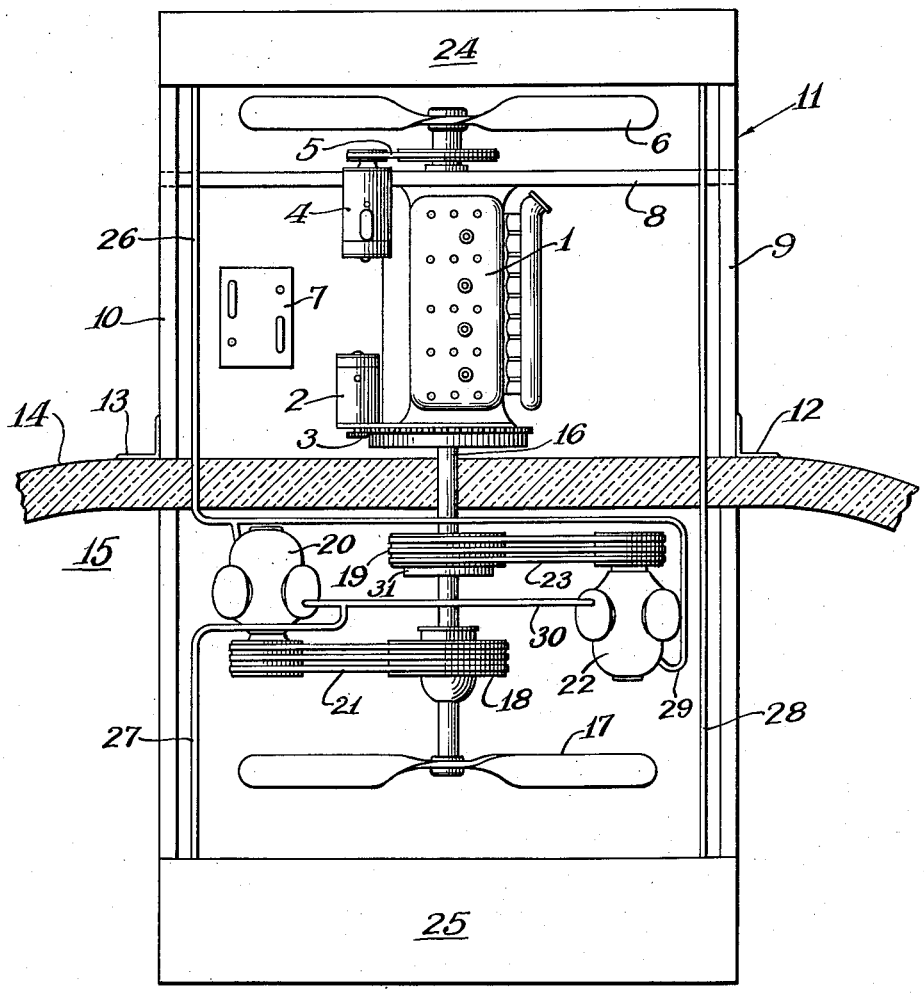
Inventor:
Adna R. Clark
Paul O. Pippel
Atty.

Patented Aug. 8, 1950

2,518,284

UNITED STATES PATENT OFFICE 2,518,284

MULTIPLE COMPRESSOR TRUCK REFRIGERATION UNIT

Adna R. Clark, Evansville, Ind., assignor to International Harvester Company, a corporation of New Jersey Application December 4, 1948, Serial No. 63,494

2 Claims. (Cl. 62—4)

This invention relates to refrigeration apparatus, but more specifically it is concerned with automotive truck-trailer refrigeration apparatus and the means for maintaining low temperatures in refrigeration units of this character.

Ordinarily in units of this character the temperature of the refrigerated compartment is maintained somewhere between 35 and 45 degrees F. and, usually, the system is designed according to the requirements necessary to maintain such temperatures. However, there are frequently occasions when it is necessary to provide much lower temperatures, usually in the zero degree F. range, and the conventional system is not designed to maintain such temperatures without dangerous overloading of the refrigeration apparatus. Although it is, of course, possible to design and provide the refrigeration apparatus necessary to maintain these low temperatures, it is not economical to do so; thus the conventional truck-trailer refrigeration unit is not suitable when products requiring low temperatures must be transported. Furthermore, the installation of refrigeration apparatus in automotive trucks and trailers has met with a certain amount of opposition from the motor transportation industry because such installations invariably introduce additional problems without always providing adequate or completely compensatory benefits. Economy dictates that trucks and trailers be operated at all times so as to permit haulage of the maximum cargo at minimum costs; hence any additional equipment, such as refrigeration apparatus carried therein, not only adds to the weight that must be transported and frequently reduces available cargo space, but also minimizes potential profits. Because of such limitations, truck-trailer refrigeration apparatus must be designed so as to have a minimum of weight and yet be capable of operation at maximum efficiency under extremely variable load conditions. Since it would be inadvisable from a technical as well as economic viewpoint to attempt to provide refrigeration apparatus with sufficient flexibility to be able to maintain the customary refrigeration temperatures and yet be suitable for maintaining the infrequently required low temperatures, the present invention is concerned with a means for providing low temperatures, when required, in a conventional system without unduly adding to the no-pay load or reducing the available cargo carrying space.

It is a principal object of this invention, therefore, to provide a novel and economical means for increasing or boosting the refrigeration capacity of automotive truck-trailer refrigeration apparatus.

Another important object is to provide a truck-trailer refrigeration apparatus with means for introducing auxiliary booster refrigeration capacity into the system.

A further object is to provide for the introduction of an auxiliary refrigerant compressor in truck-trailer refrigeration apparatus so that the capacity of said compressor may be used to supplement the capacity of the refrigeration system in maintaining low temperatures.

A still further object is to provide automotive truck-trailer refrigeration apparatus having a primary compressor and a separate auxiliary compressor that may be operatively coupled into the refrigeration system when low temperatures are required in the refrigerated compartment.

A yet still further object is to provide automotive truck-trailer refrigeration apparatus having a primary compressor and a separate auxiliary compressor that may be automatically coupled into or out of parallel operation with the primary compressor when low temperatures are required to be maintained in the refrigerated compartment.

The foregoing and other objects and features of the invention will become apparent as the disclosure is more fully made in the following detailed description of a preferred embodiment of the invention as illustrated in the accompanying sheet of drawing in which the figure is a schematic layout of an automotive truck-trailer refrigeration unit which has been provided with a booster or auxiliary compressor in accordance with the teachings of this invention.

Referring to the drawing, it will be noted that a conventional truck-trailer refrigeration unit has been illustrated in diagrammatic form and further shown as positioned with a portion thereof projecting into a refrigerated compartment, while the remainder is exposed to the outside atmosphere. In the drawing, a driving motor, usually an internal combustion engine, is indicated generally by the numeral 1 and may be provided with a starter motor 2 and its associated starter mechanism 3, and a generator 4 operatively coupled by a driving belt 5 to a fan 6 which, in turn, is driven directly by the engine 1. A storage battery 7 may be used to provide the necessary source of electrical energy to operate said engine. The engine and its associated components may be fixedly secured, as by a plurality of transverse members such as the one indicated by the numeral 8, to longitudinally extending side rails 9 and 10 of a frame structure indicated generally by the numeral 11. Since the details of this frame structure are not important to the teachings of this invention, further description thereof appears unnecessary. Suffice it to say, however, that in a unit of this character the side rails 9 and 10 are usually affixed, by some suitable means such as the angle members 12 and 13, to the outside of the wall 14, which, in this case, represents a portion of an insulated wall that encloses a refrigerated compartment 15.

A drive shaft 16, which may be operatively connected by any suitable means with the drive shaft of the engine, extends through the wall 14 and into the refrigerated compartment 15 where it has affixed thereabout a fan 17, a pulley 18 and a clutch pulley 19. A refrigerant compressor 20, which may be affixed by suitable means to the portion of the frame 11 that extends into the refrigerated compartment, is connected by a driving belt 21 with pulley 18 and drive shaft 16, while a second compressor 22 is likewise connected through a driving belt 23 to clutch pulley 19 and said drive shaft 16. It will be understood that suitable means will likewise be provided for fixedly supporting the compressor 22 on the frame structure.

A condenser, indicated generally by the numeral 24, may be mounted by suitable means on the frame 11, but preferably on the outside ends of the side rails 9 and 10, while an evaporator, indicated generally by the numeral 25, may be similarly mounted on the opposite ends of said side rails disposed within the refrigerated compartment 15. A conduit 26 connects the discharge outlet of the compressor 20 with the condenser 24 and a conduit 27 connects the suction side of said compressor with the evaporator 25, while a conduit 28 provides a connection between said condenser and evaporator. Additional conduit lines 29 and 30 interconnect the two compressors 20 and 22.

The clutch pulley 19, in accordance with the teachings of this invention, is adapted for driving engagement with the drive shaft 16 through an automatically controlled clutch 31, which may be engaged or disengaged according to predetermined temperature conditions within the refrigerated compartment 15. A clutch of this character may be electrically operated and actuated by the electrical system of the engine, or it may be mechanically operated through appropriate mechanism (not shown). In either case, its operation would be controlled by thermostatic control means responsive to pre-selected temperatures in the refrigerated compartment. Since no claim is made to the specific type of control for such a clutch mechanism further details thereof are not included herein. It will be understood, however, that any one of many such commercial products as are now available on the market may be suitably employed for effecting the control desired without in any way limiting the scope of the present invention.

In operation a refrigeration unit of this character functions, under normal operating conditions, in accordance with well-known principles. Refrigerant compressed in the compressor 20 is discharged through conduit 26 into condenser 24 where it is cooled and then directed, by way of conduit 28, into the evaporator 25. Upon leaving the evaporator the heated refrigerant returns, by way of conduit 27, to the suction inlet of the compressor 20 to complete its normal cycle. Conventional thermostatic control means, or the like, may be provided to maintain the refrigerated compartment at the desired predetermined temperature.

Now, as heretofore discussed, when a temperature lower than that for which the system is ordinarily adapted is desired, the refrigeration unit operates in effecting the initial pull down of the temperature in the refrigerated compartment, and when this temperature reaches a predetermined value the thermostatic control provided for the auxiliary compressor operates to actively engage the clutch 31 and drivingly connect the drive shaft 16 with said auxiliary compressor 22 whereupon both compressors operating together further lower the temperature of the compartment to that ultimately desired. When the auxiliary compressor 22 is set into operation it immediately supplements the flow of refrigerant from the primary compressor 20, through the condensor 24 and evaporator 25, and, operating in parallel with said primary compressor, functions to provide the additional piston displacement necessary to effectuate and maintain the desired lower temperature in the refrigerated compartment. The engagement and disengagement of the auxiliary compressor 22 through the clutch 31 may be effected by means of a conventional mechanical mechanism or by electrical means as heretofore explained. Upon completion of the demand for the lower temperature in the refrigerated compartment the auxiliary thermostatic control by which such temperature is governed may be disengaged, whereupon the refrigeration unit will return to normal operation and thereafter continue to maintain the customary temperature therein.

It will be apparent from the above description that the present invention substantially extends the usefulness of conventional automotive truck-trailer refrigeration apparatus and envisages the adaptation thereof to such a system with a minimum of alteration and the addition of relatively few parts. The proposed invention, furthermore, is readily adaptable to such systems without necessitating any costly redesign of apparatus, and is relatively inexpensive to install.

It should now be apparent that a novel low-temperature truck-trailer refrigeration unit has been shown and described, and it is to be understood that changes may be made in the construction without departing from the spirit of the invention or the scope thereof as defined in the appended claims.

What is claimed is:

1. In refrigeration apparatus of the class described, in combination: a compressor, a condenser, and an evaporator connected in a closed circuit; engine means for driving said compressor; said engine having a drive shaft extending from opposite ends thereof with one end of said shaft terminating proximate the condenser and being provided with a fan for circulating air over the condenser while the opposite end of said shaft terminates proximate the evaporator and is provided with a fan for circulating air over said evaporator; said shaft having driving means securely positioned thereon, intermediate the evaporator fan and the engine, that is adapted for engaging said compressor in driving relation with said engine; means including an auxiliary compressor adapted to operate in parallel with the compressor of the refrigeration apparatus for increasing the refrigeration capacity thereof; and having said engine shaft further provided with clutch means positioned thereon intermediate said evaporator fan and said engine for engaging and disengaging said auxiliary compressor in driving relation with said engine.

2. In refrigeration apparatus of the class described, in combination: a compressor, a condenser, and an evaporator connected in a closed circuit; an internal combustion engine; said engine having a drive shaft extending from opposite ends thereof with one end of said shaft terminating proximate the condenser and being provided with a fan for circulating air over the condenser while the opposite end of said shaft terminates proximate the evaporator and is provided with a fan for circulating air over said evaporator; said shaft having driving means securely positioned thereon intermediate the evaporator fan and the engine that is adapted for engaging said compressor in driving relation with said engine; said compressor being spaced from and positioned to one side of said shaft; means including an auxiliary compressor adapted to operate in parallel with the compressor of the refrigeration apparatus for facilitating the production of low temperatures in said refrigeration circuit; said auxiliary compressor being spaced from and positioned to the side of said shaft opposite from that of said other compressor; and having said engine shaft further provided with clutch means positioned thereon intermediate said evaporator fan and said engine for engaging and disengaging said auxiliary compressor in driving relation with said engine.

ADNA R. CLARK.

REFERENCES CITED

The following references are of record in the file of this patent:

UNITED STATES PATENTS

| Number | Name | Date |
|---|---|---|
| 1,943,963 | Hulse | Jan. 16, 1934 |
| 2,157,329 | Fillo | May 9, 1939 |
| 2,193,837 | Winther et al. | Mar. 19, 1940 |
| 2,231,069 | Harris | Feb. 11, 1941 |
| 2,274,774 | Chambers | Mar. 3, 1942 |
| 2,281,626 | Smith | May 5, 1942 |